(12) United States Patent
Holostov et al.

(10) Patent No.: US 8,255,999 B2
(45) Date of Patent: Aug. 28, 2012

(54) ANTI-VIRUS SCANNING OF PARTIALLY AVAILABLE CONTENT

(75) Inventors: Vladimir Holostov, Hadera (IL); Yigal Edery, Pardesia (IL)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 11/753,439

(22) Filed: May 24, 2007

(65) Prior Publication Data
US 2008/0295176 A1 Nov. 27, 2008

(51) Int. Cl.
G06F 11/00 (2006.01)
(52) U.S. Cl. .......... 726/24; 726/22; 726/23; 726/25; 726/26; 713/176; 713/188; 707/747; 707/758
(58) Field of Classification Search .......... 726/22–26; 713/176–188; 707/747–758
See application file for complete search history.

(56) References Cited

U.S. PATENT DOCUMENTS

| | | | |
|---|---|---|---|
| 6,088,803 A * | 7/2000 | Tso et al. | 726/22 |
| 6,701,440 B1 | 3/2004 | Kim et al. | |
| 6,732,279 B2 | 5/2004 | Hoffman | |
| 6,757,830 B1 | 6/2004 | Tarbotton et al. | |
| 6,763,466 B1 * | 7/2004 | Glover | 726/24 |
| 6,785,732 B1 | 8/2004 | Bates et al. | |
| 6,792,543 B2 | 9/2004 | Pak et al. | |
| 6,851,058 B1 | 2/2005 | Gartside | |
| 6,873,988 B2 | 3/2005 | Herrmann et al. | |
| 6,898,715 B1 | 5/2005 | Smithson et al. | |
| 6,910,134 B1 | 6/2005 | Maher, III et al. | |
| 6,981,280 B2 | 12/2005 | Grupe | |
| 7,069,594 B1 * | 6/2006 | Bolin | 726/26 |
| 7,093,002 B2 | 8/2006 | Wolff et al. | |
| 7,237,008 B1 | 6/2007 | Tarbotton et al. | |
| 7,490,353 B2 | 2/2009 | Kohavi | |
| 7,549,055 B2 * | 6/2009 | Zimmer et al. | 713/188 |
| 7,636,946 B2 * | 12/2009 | Verma et al. | 726/24 |
| 7,640,586 B1 * | 12/2009 | Johnson et al. | 726/24 |
| 7,647,622 B1 | 1/2010 | Sobel et al. | |
| 7,716,741 B2 * | 5/2010 | Forman et al. | 726/24 |
| 7,971,254 B1 * | 6/2011 | Ji et al. | 726/24 |

(Continued)

FOREIGN PATENT DOCUMENTS

EP 1720112 A2 11/2006

OTHER PUBLICATIONS

Derek Uluski, Characterizing antivirus workload execution, Mar. 2005, ACM SIGARCH Computer Architecture, vol. 33, pp. 2-8.*

(Continued)

*Primary Examiner* — Nathan Flynn
*Assistant Examiner* — Viral Lakhia
(74) *Attorney, Agent, or Firm* — Lee & Hayes, PLLC

(57) ABSTRACT

A client device transmits requests via a gateway to a server in a network environment. The requests indicate specific portions of a file on a server to be transmitted as part of the download process. The gateway receives into its memory the requested portions of the file and assembles the received portions into an assembly file. The gateway continuously scans the largest contiguous sequence of the portions in the assembly file for viruses while the requested portions of the file are being received and become available before feeding the received portions to the client computer. By scanning the largest consecutive sequence while new portions become available, the time to complete the scan is reduced thereby increasing the throughput of the gateway.

18 Claims, 4 Drawing Sheets

U.S. PATENT DOCUMENTS

| | | | |
|---|---|---|---|
| 2002/0138766 A1* | 9/2002 | Franczek et al. | 713/201 |
| 2003/0110280 A1 | 6/2003 | Hinchliffe et al. | |
| 2003/0196103 A1 | 10/2003 | Edwards et al. | |
| 2004/0111531 A1 | 6/2004 | Staniford et al. | |
| 2004/0172551 A1 | 9/2004 | Fielding et al. | |
| 2005/0021994 A1 | 1/2005 | Barton et al. | |
| 2005/0027686 A1 | 2/2005 | Shipp | |
| 2005/0081053 A1 | 4/2005 | Aston et al. | |
| 2005/0091538 A1 | 4/2005 | Hoche et al. | |
| 2005/0138395 A1 | 6/2005 | Benco et al. | |
| 2005/0149749 A1* | 7/2005 | Van Brabant | 713/200 |
| 2005/0172338 A1 | 8/2005 | Sandu et al. | |
| 2005/0246767 A1 | 11/2005 | Fazal et al. | |
| 2006/0075494 A1 | 4/2006 | Bertman et al. | |
| 2006/0075502 A1 | 4/2006 | Edwards | |
| 2006/0077979 A1* | 4/2006 | Dubrovsky et al. | 370/394 |
| 2006/0130141 A1 | 6/2006 | Kramer et al. | |
| 2006/0218637 A1* | 9/2006 | Thomas et al. | 726/23 |
| 2006/0230454 A1 | 10/2006 | Achanta et al. | |
| 2007/0006027 A1 | 1/2007 | Desouza et al. | |
| 2007/0101432 A1 | 5/2007 | Carpenter | |
| 2007/0182983 A1 | 8/2007 | Wyatt et al. | |
| 2007/0192861 A1* | 8/2007 | Varghese et al. | 726/23 |
| 2007/0283440 A1* | 12/2007 | Yao et al. | 726/24 |
| 2008/0047009 A1* | 2/2008 | Overcash et al. | 726/23 |
| 2009/0307776 A1 | 12/2009 | Curnyn | |

OTHER PUBLICATIONS

"Running F-Secure Anti-Virus Client Security", retrieved on Nov. 20, 2006 at <<https://www.st-andrews.ac.uk/its/help/viruses/fscs/fscsrun.shtml >>, pp. 1-2.

"Setting 'Real Time Protection'," available as early as Nov. 20, 2006, retrieved on May 30, 2007, at <<http://www.kaspersky.com/faq?chapter=170709330&qid=173964510>>, Kaspersky Lab, pp. 1-5.

"Virus Protection Across the Enterprise", retrieved at <<http://www.softwarespectrum.com/business/TAAP_Library/Trend_docs/AVacrossThe EnterpriseGL.pdf>>, Net Screen Technologies, Inc. and Trend Micro, Inc., Nov. 2003, pp. 1-10.

PCT Intl Search Report and Written Opinion for Application No. PCT/US2008/063995, dated Nov. 27, 2008, 10 pgs.

"[Tool] PYthon MAil Virus Scanner", Mar. 31, 2004, 2 pages.

"McAfee", IT Secure Software Pvt. Ltd, retrieved on Nov. 17, 2006 at http://www.itsecure.com/mcafee.html, SiteWhizo, 1 pg.

"Product Description, Kaspersky Anti-Virus 6.0", retrieved on Nov. 17, 2006, Kaspersky Lab, 1997-2006, pp. 1-4.

Chinese Office Action mailed Jul. 13, 2011 for Japanese patent application No. 200880017269.3, a counterpart foreign application of U.S. Appl. No. 11/753,439, 10 pages.

\* cited by examiner

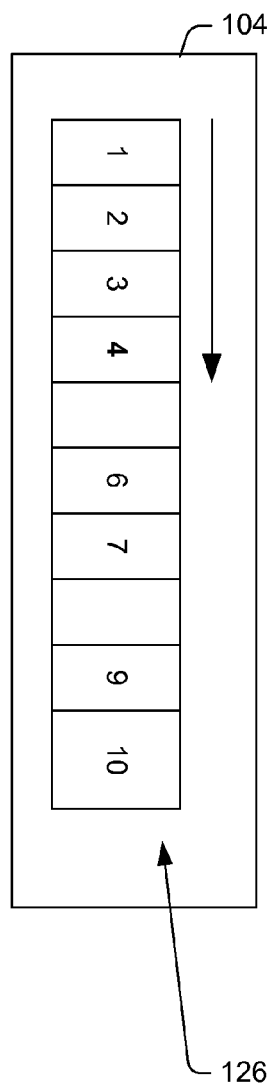 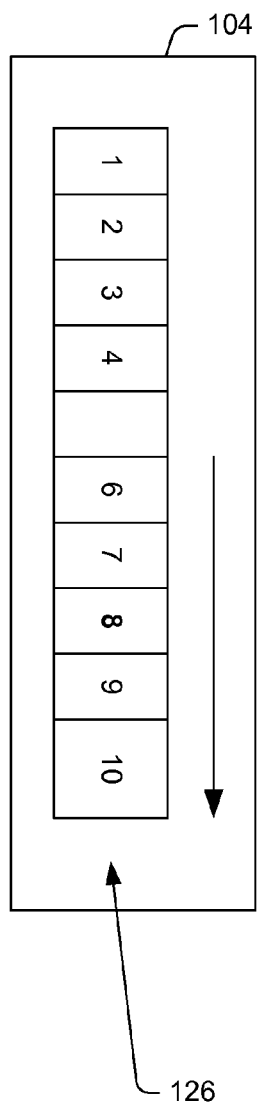 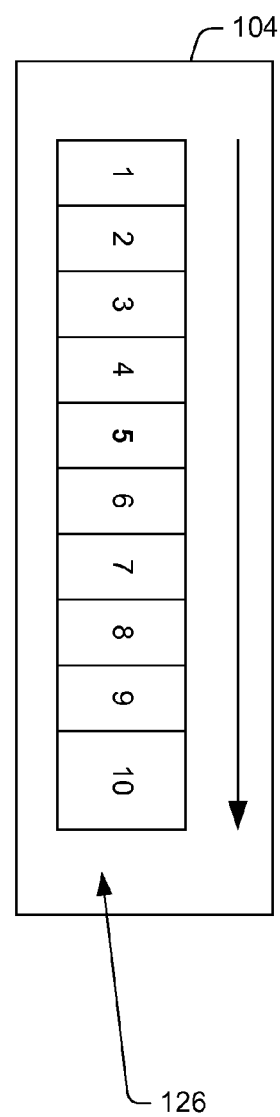
*FIGURE 2a*  *FIGURE 2b*  *FIGURE 2c*

ANTI-VIRUS SCANNING OF PARTIALLY AVAILABLE CONTENT

BACKGROUND

There are two generally accepted methods for a computer application to download a file from a remote location. In the first method, a client computer connects to a server either directly or via a network gateway. The client computer transmits a request for the server to transmit a whole file at once. The server responds to the request by sending the whole file, typically in packet form, to the client computer. In the second method, the client computer transmits a sequence of requests to the server, or a peer computer (such as in a pear to pear network), where each request asks for specific portions of the file.

Requesting specific portions of the file is preferable to requesting the entire file at once because it allows for resuming of the download if the connection is broken. Requesting specific portions of the file also allows for more efficient utilization of available bandwidth because the client computer can request more portions when more bandwidth is available and fewer portions when less bandwidth is available.

The downloaded portions of the same file can be of different sizes, can be received out of order or can overlap previously downloaded portions. This brings a challenge to an anti-virus (AV) application disposed in the network gateway (or host computer) when the application performs anti-virus scanning and inspection of routed traffic. The scanning process involves an AV application that contains a virus reference signature or heuristical pattern that is compared against the content being downloaded from the remote location. In many cases, anti-virus application must scan an entire file to ensure that no viruses are embedded in the file.

Usually, it is not possible to download the whole file for anti-virus scanning after a portion of the file is requested. The whole file can be very large, requiring significant network bandwidth and time to complete the download. Existing AV solutions either attempt to download the entire file before scanning or limit the scanning to the content of the downloaded portions. Inspecting only a portion of the content downloaded is not sufficient to detect a virus. The virus signature may be spread over two or more portions of the file and may not be identifiable when each file portion is scanned separately.

SUMMARY

This Summary is provided to introduce concepts in a simplified form that are further described below in the Detailed Description. This Summary is not intended to identify key features or essential features of the claimed subject matter, nor is it intended to be used to limit the scope of the claimed subject matter.

Described herein are, among other things, embodiments of various technologies for use in anti-virus scanning of content. In accordance with one embodiment, client devices transmit requests for a download of content via a network gateway to a server. The requests indicate specific portions of the content to be transmitted and the order that the portions should be transmitted. The gateway receives in its memory the requested portions of the content. The portions are assembled into blocks and are arranged in the same sequence as when they were stored on the server. This arrangement may be different than the sequence that the portions were received via the network. The gateway scans the block with the largest contiguous number of portions for a virus as the requested portions of the file are received.

By scanning the block with the largest contiguous number of portions, a virus can quickly be identified across portion boundaries so that if a virus is detected the remainder of the download can be aborted. This can be done while avoiding the traditional less effective solution of either completely blocking files that are downloaded in portions, or not scanning them for viruses, thus increasing the security provided by the gateway while maintaining the normal end user experience and allowing such downloads to occur.

Because the gateway inspects small combinations of file portions before the entire file is available at the gateway. Once the final portion is received, a final scan is performed on the entire file. The final scan faster would then be faster than if the gateway had waited for the entire file to be available because only a subset of virus signatures needs to be compared. Further the gateway able to process more requests because it can abort downloads of infected files.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 2a-c is a diagram illustrating the content being received, assembled and scanned by the gateway in FIG. 1.

DETAILED DESCRIPTION

Overview

Described herein are, among other things, embodiments of various technologies for use in anti-virus scanning of content. In accordance with one embodiment described herein, an anti-virus scanning system transfers portions of content via a network gateway (or any host computer) from a server (or any pear computer) to a client computing device in response to requests from the computing device. The portions are received by the gateway and are assembled into an assembly file. The gateway scans a block of the largest contiguous number of the portions in the assembly file for viruses while the requested portions of the file are being received.

Example System Architecture

Figure 1:
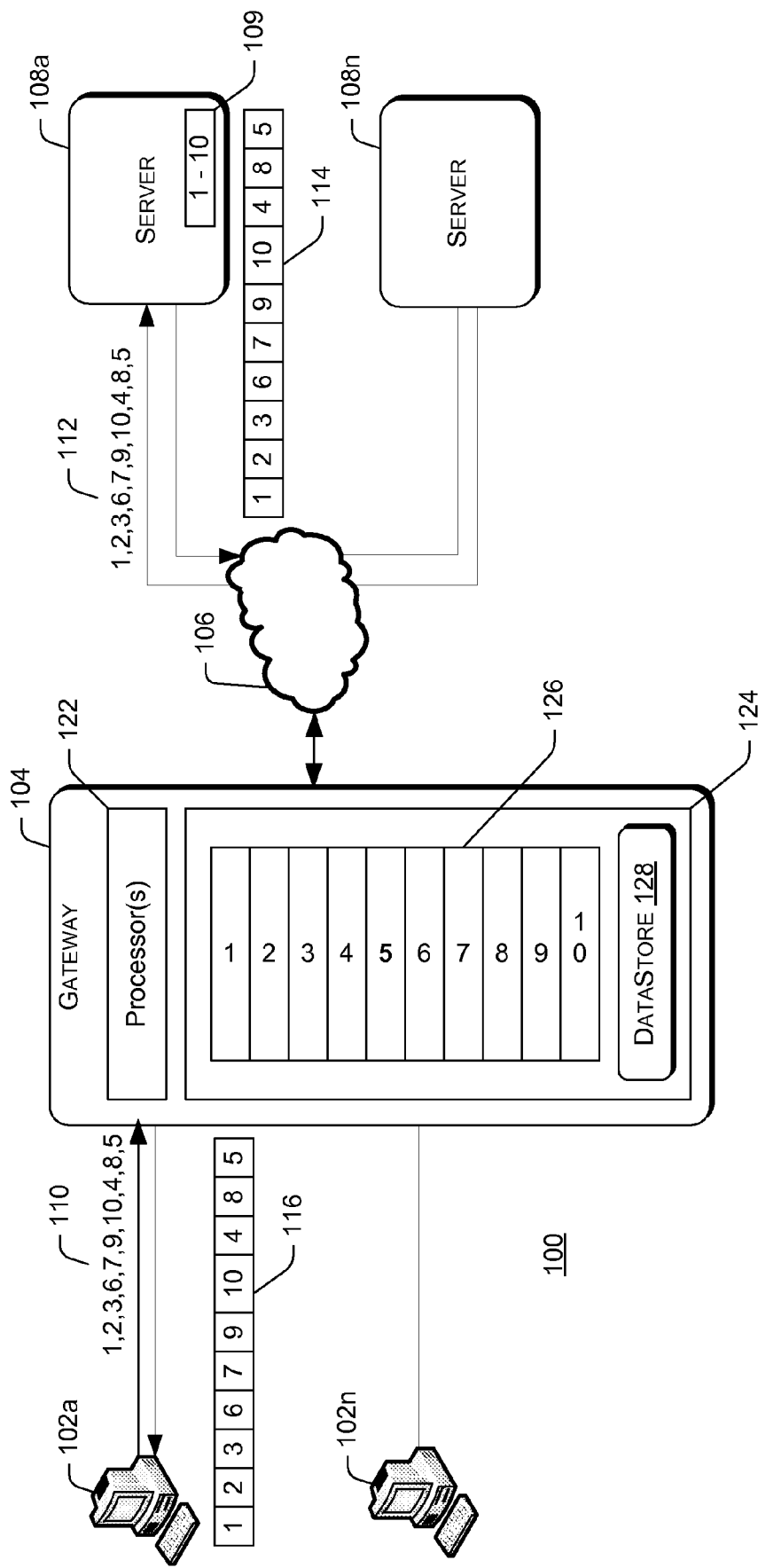
FIG. 1 illustrates an exemplary architecture in which anti-virus scanning of partially available content may be implemented.

Illustrated in FIG. 1 is a virus detection system 100 including client computing devices 102a-102n coupled via a network gateway 104 through a network 106 to servers 108a-108n. Although gateway 104 is shown, any type of network processing device that can scan for viruses may be substituted for gateway 104. Examples of such a processing device include a proxy server and a general purpose computer.

Stored in server 108a is a content file 109. The content file has portions 1-10 arranged in an original sequential order. In one embodiment, client computer device 102a transmits a request indicating which portions 110 of content file 109 stored on server 108a are to be downloaded. Specifically device 102a requests that portions 110 be transferred in requested order 1, 2, 3, 6, 7, 9, 10, 4, 8 and 5. Gateway 104 then feeds portion request 112 via network 106 to server 108a. Server 108a responds by transmitting portions 109 in the requested order as portions 114 to gateway 104.

Gateway 104 includes one or more processors 122 and memory 124. Stored in memory 124 are assembly file 126 and datastore 128. Portions 114 are received by gateway 104 and stored using processor(s) 122 in memory 124. In an exemplary embodiment, as portions 114 are received, processor 122 arranges the received portions into blocks within an assembly file 126 in their original sequential order. Also as portions are received, the largest block of contiguous portions in assembly file 126 is scanned to determine if a virus is present. Examples of the scanning process are described in FIGS. 2a-2c.

Virus signatures are stored in a datastore 128. The datastore 128 is periodically updated with new virus signatures. In one embodiment, scanning is performed by comparing portions of the assembly file 126 against the virus signature. In another embodiment, antivirus scanning is not limited to signature comparison. Scanning may be performed by first determining the type of the content, then performing both regular expression matching (looking for a signature) and behavior analysis, executing portions of the file in an isolated environment to observe what the executed portions tries to do.

In one embodiment, certain portions of the assembly file 126 known not to contain viruses and know to contain viruses may be identified. The portions known not to contain virus may be skipped when scanning. In one embodiment, the AV engine will determine that it needs to scan the whole file to inspect the content (e.g. when archives that cannot be unpacked unless the whole file is present). In these cases, the AV engine will scan the files only once, e.g. when all the portions are available.

If a virus is not detected when scanning, gateway 104 would continue to arrange the received portions in sequential order within blocks for the entire requested (or partially requested) content file. The size of the virus signature may be larger than a combination of many received portions. Thus the gateway scans all the requested portions before they are disassembled from the assembly file 126 and fed as disassembled portions 116 to device 102a. Specifically once the all the portions in the request (or partial request) are received, gateway 104 feeds the dissembled portions 116 to the device 102a in the order requested by device 102a.

After each portion is received, assembled, and the largest available portions of the assembly file 126 is scanned and if no viruses are detected, the last received portion is fed to client computing device 102a. This ensures clients don't have to wait while gateway 104 is assembling or fetching additional portions.

In one embodiment, if a virus is detected in assembly file 126, the infected portion of the assembly file is purged and is not fed to client device 102a. Also upon virus detection, an indication may be provided to client 102a of the portion of the file 126 that is infected. Further, in another embodiment, an indication of an infected file may be fed to client device 102a by embedding a virus indication with the portions 116 sent to the client device 102a, or such indication may be sent to a system administrator (not shown).

FIGS. 2a-2c illustrate memory 104 comprising assembly file 126 in memory 104 of gateway 104 at sequential points in time after receiving content in response to a single request from device 102a. In one embodiment, gateway 104 may detect the requests from device 102a, and assemble the response from multiple requests into blocks within a single assemble file 126 for scanning. In another embodiment the gateway 104 may detect the response from a single request before forwarding scanned content to device 102a. Assembly file 126 is depicted in FIGS. 2a and 2b as containing partially available content. Assembly file 126 is depicted in FIG. 2c to include the entire content file 109.

Referring to FIG. 2a, portions 114 (FIG. 1) of content file 109 are received and stored in assembly file 126. As the portions 114 are received, they are arranged in their original sequential order (See also FIG. 1). Also as more portions 114 are received, the block with the largest number of portions that are in a contiguous order is scanned to determine if a virus is present. In one embodiment, either a minimum threshold number of portions or a number of portions in aggregate having a minimum size must be received before the portions are scanned. Assembly file 126 may be scanned after reception of each new portion is received. Further when the entire content file is stored in the assembly file 126, the entire file may be scanned to determine if a virus is present.

For example, in FIG. 2a received portions 1-3, 6, 7, 9 and 10 are assembled in memory 124 to create assembly file 126. In this example the minimum threshold number of portions may be set to four. Thus once portion 4 is received, portion 4 is assembled with portions 1-3, 6, 7, 9 and 10 in assembly file 126 to create a block having portions 1-4, a block having portions 6-7 and a block having portions 9-10. The largest block of contiguous portions, e.g. the block containing portions 1-4, is scanned to determine if a virus is present. If a virus is not present, then additional portions would be received.

Referring to FIG. 2b, portion 8 is received. Portion 8 is then assembled with portions 1-4, 6-7, and 9-10 in assembly file 126 to create a block having portions 1-4 and a block having portions 6-10. The largest block of contiguous portions, e.g. the block containing portions 6-10, is scanned to determine if a virus is present. If a virus is not present, then additional portions would again be received.

Referring to FIG. 2c, portion 5 is received and is assembled with portions 1-4, and 6-10 in assembly file 126 to create a block having portions 1-10. The largest block of contiguous portions, e.g. the block containing portions 1-10, is scanned. Although an exemplary content file 109 having ten portions is shown, larger files having additional portions may be assembled and scanned in a similar manner, e.g. by scanning the largest block of contiguous portions in the assembly file 126.

Figure 3:
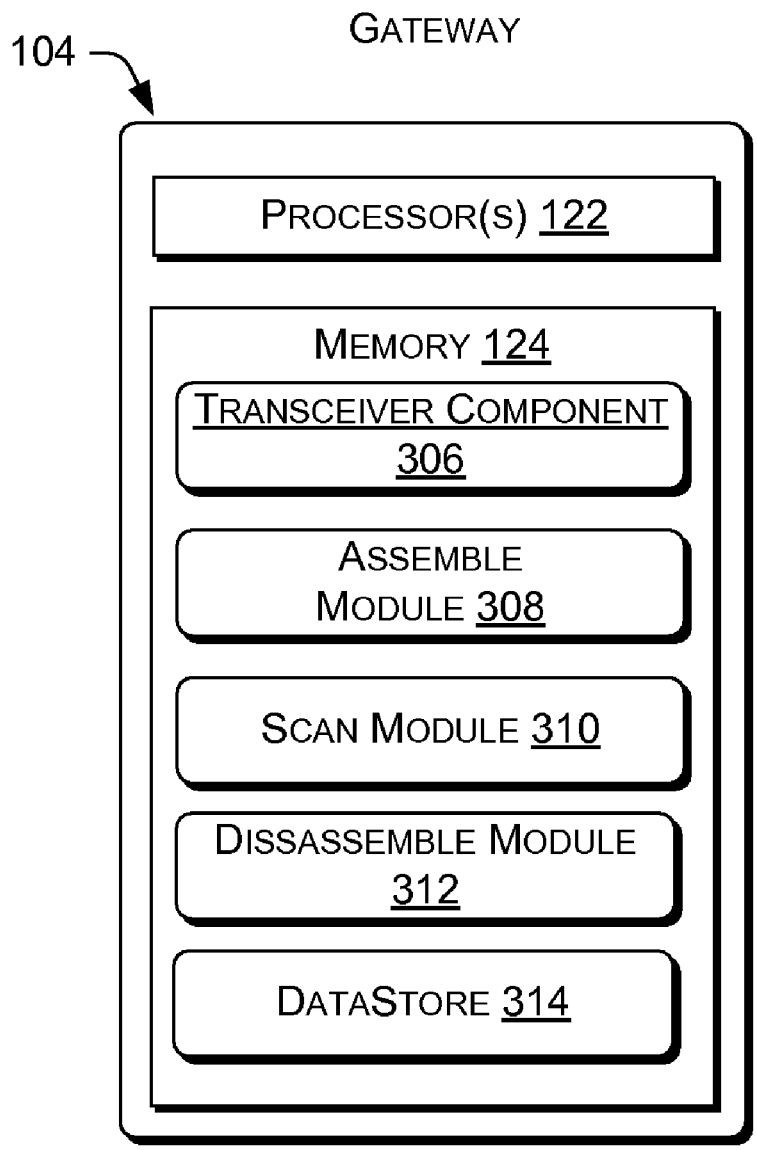
FIG. 3 is a block diagram depicting selected modules in a network gateway in the anti-virus scanning system.

In FIG. 3 illustrates selected modules in gateway 104 of the virus detection system 100 shown in FIG. 1. Gateway 104 has process capabilities and memory suitable to store and execute computer-executable instructions. In one example, gateway 104 includes one or more processors 122 and memory 124.

The memory 124 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 124 of the gateway 104 are a transceiver component 306, an assemble module 308, a scan module 310, a disassemble module 312, and a datastore 314. These modules and components 306-314 may be implemented as software or computer-executable instructions that are executed by the one or more processors 122.

Transceiver component 306 receives information and requests from client computer devices 102(a-n) and feeds those requests to servers 108(a-n) via network 106. In one embodiment, such requests may conform to a hyper-text transfer protocol (HTTP) and a Transmission Control Protocol/Internet Protocol (TCP/IP). Transceiver component 306 transfers content received by gateway 104 from servers 108 (a-n) to client computer devices 102(a-n) and transfers content from client devices 102(a-n) to servers 108(a-n). In one embodiment such content is transferred directly from memory 124.

Assemble module 308 accumulates and stores in memory 124 portions received from servers 108(a-n). The portions are stored sequentially in data blocks within an assembly file. The largest contiguous portions may be scanned for viruses. Scan module 310 scans the block with the largest number of contiguous portions in the assembly file as the portions are being received by gateway 104. The block is scanned to detect viruses including viruses having a signature that extends across portion boundaries. By scanning the largest contiguous portions, the downloading process may be quickly terminated if a virus is detected and the likelihood of detecting the virus in partial content increases.

Disassemble module 312 disassembles the assembly file into disassembled portions for transmission to client computer devices 102(a-n). Upon disassembly of the assembly file, the disassembled portions 116 are arranged to be transmitted to client computer devices 102(a-n) in the order indicated by request 110. In a simpler embodiment, every portion is sent to the client 102 when it's received, immediately after the largest contiguous portion is scanned.

Contained in datastore 314 are the signatures of the viruses that may be updated from time to time. In another embodiment, inspection logic is included in the AV engine and the AV engine is updated frequently to detect new malware. Also stored in datastore 314 may be names or network addresses (such as a uniform resource locator URLs) for content files from server 108(a-n) in which viruses were previously detected. In one embodiment, the assembly file may be stored in datastore 314.

Exemplary Process

Figure 4:
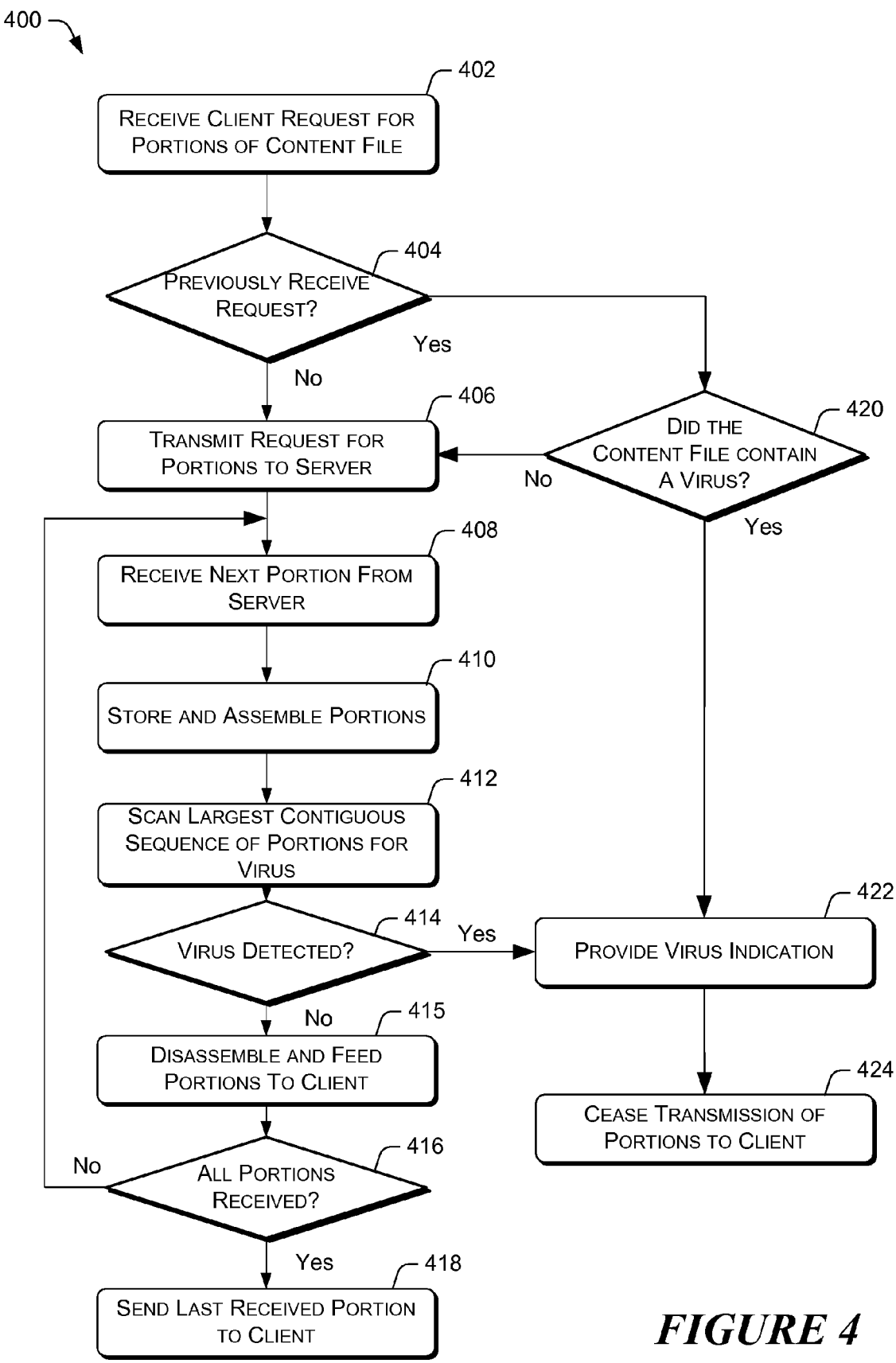
FIG. 4 is a flow diagram of an exemplary process used to scan partially available content while the content is being routed in a gateway.

The exemplary process in FIG. 4 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to system 100 of FIG. 1, although it may be implemented in other system architectures.

FIG. 4 illustrates a flow diagram of an exemplary process 400 used by gateway 104 (see FIG. 1) of the virus detection system 100, to scan partially available content for viruses. Although the flow diagram is depicted in the order of blocks shown, blocks 402-424 do not have to be implemented in any particular order.

At block 402, gateway 104 connects with one of the client devices 102(a-n) and one of the servers 108(a-n). Gateway 104 also receives a request from one or more of the client computer devices 102(a-n) for portions 110 of content file 109. In one embodiment the client computer devices 102(a-n) actually specify the order in which the portions are to be transmitted from server 108 (a-n). In another embodiment, the client computer devices 102(a-n) may transmit a file name or file address as the request. For the purpose of example, in process 400 gateway 104 receives requests from client 102a for transmission to server 108a.

In block 404, the gateway 104 determines, by comparing information in the datastore 214 against the client computer device's 102a request, whether the received request for the portion of the content file has previously been made. Such a determination may be made by examining the request to identify the address or the name of the requested file. If such identification has been made previously ("yes" to block 404), then in block 420 a determination is made as to whether the previously requested file contained a virus. If the file has not previously been requested ("no" to block 404), then the client device's request 110 for the portion of the content file 109 is transmitted to server 108a in block 406.

Next in block 408, the gateway 104 receives a next portion of the content file 109 from server 108a. In block 410, the gateway 104 stores the received portion in memory 124 and assembles the portion in sequential order into a block within an assembly file. Then in block 412, the gateway 104 scans the block with the largest number of contiguous portions in the assembly file by comparing one or more portions against the virus signatures retrieved from the datastore 214. Such scanning may be done continuously across portion boundaries while other portions of the content file are being received by gateway 104. If the virus signature matches the assembly file, a virus would be detected. In one embodiment, a minimal size of the block to be scanned and a maximum number of times an assembly file will be scanned may be configured in gateway 104. If the minimum block size is not present, then the assembly file may not be scanned.

In another embodiment, the file format of the assembly file is identified by the gateway 104 (by combining information about the object name or type conveyed by the delivery protocol, or by looking at contiguous portions that have been assembled and determining the file format based on actual content). Certain portions of the assembly file known to not contain a virus may also be identified and thus would not be scanned. For example, if the assembly file in question was identified as a JPEG file, the gateway 104 will assume that the malicious code might be found in an EXIF portions and pass the other file portions (Non-EXIF portions) without scanning them.

In block 414, the gateway 104 determines if a virus was detected. If it was ("yes" to block 414), gateway 104 provides a virus indication to an administrator device (not shown) or to the client computer in block 422. If a virus was not detected ("no" to block 414), the portions are disassembled from the assembly file in block 415 and fed as disassembled portions 116 (FIG. 1) to the client computer device 102a in the order that the portions were requested in request 110. The current portion (or portions) is sent to the client computer device 102a before all the portions are received by gateway 104. Then a determination is made whether all the portions of the requested file have been received by gateway 104 (e.g. whether a gateway 104 has received a complete assembly file) in block 416. If all the portions have not been received ("no" to block 416), upon a request from the client computer the next portions of the content file is received in block 408. If all the portions of the content file have been received ("yes" to block 414), then the last received portion from server 108a is sent to client computer device 102a in block 418.

After a virus is indicated in block 422, in one embodiment, the viral portions of the assembly file are purged and transmission of the portion of the file containing the virus to client computer device 102*a* is terminated in block 424. In block 424 in another embodiment, the portion of the file containing the virus may be flagged before that portion is fed to the client computer device 102*a*.

If the previously requested file was already determined to contain a virus ("yes" to block 420), then a virus indication is provided in block 422. If the file was not determined to contain a virus ("no" to block 420), then the portion request 112 is fed to server 108*a* in block 406.

Conclusion

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   receiving requests from a client computer indicating specific portions of a content file and a requested order that the specific portions are to be transmitted, wherein the requests indicate specific portions of the content file to be transmitted with a sequential order and out of the sequential order;
   transmitting the requests to a server;
   periodically receiving from the server the requested portions of the content file;
   assembling the received portions into blocks of contiguous received portions;
   determining a largest of the blocks while the requested portions are being received;
   continuously scanning the received portions in the largest of the blocks for viruses while the requested portions are being received;
   disassembling the scanned received portions into the requested order; and
   feeding the disassembled scanned received portions to the client computer in the requested order.

2. The method as recited in claim 1 wherein the content file comprises portions that are arranged in an original sequential order, wherein the received portions are assembled in the original sequential order, and wherein scanning the received portions in the largest of the block comprises scanning contiguous received portions in the largest block in the original sequential order.

3. The method as recited in claim 2 wherein scanning comprises comparing the portions in the largest block against a virus signature.

4. The method as recited in claim 1 further comprising identifying received portions in the largest block that are likely to contain a virus and scanning the identified received portions while not scanning unidentified received portions.

5. The method as recited in claim 4 further comprising providing an indication of a virus and purging received portions containing the virus on identification of the virus.

6. A system for transmitting content comprising:
   a first computer to partition a content file into a plurality of portions with an original sequential order;
   a gateway coupled via a network to the first computer and a second computer;
   said second computer to request a plurality of portions in a requested sequence from the first computer via the gateway, the requested sequence being specified as having some of the plurality of portions out of the original sequential order;
   said first computer to transmit the plurality of portions corresponding to the request;
   said gateway to receive the plurality of portions in a memory, to assemble the received portions into an assembly file into the original sequential order while the plurality of portions are being received, to determine a largest of multiple consecutive sequences of portions in the original sequential order within the assembly file, to scan the largest of multiple consecutive sequences of portions in the original sequential order within the assembly file for viruses, to disassemble the scanned assembly file into disassembled portions, and to feed the disassembled portions to the second computer; and
   said second computer to receive the disassembled portions and to assemble the disassembled portions into the original sequential order.

7. The system as recited in 6 wherein the scanned assembly file is disassembled and the disassembled portions are fed to the second computer while other requested portions are being received.

8. The system as recited in 6 wherein the disassembled portions are fed to the second computer in the requested sequence.

9. The system as recited in 6 wherein feeding the disassembled portions to the second computer is terminated if a virus is detected when scanning the assembly file.

10. The system as recited in claim 6 wherein an indication is provided to the second computer if a virus is detected when scanning the assembly file.

11. The system as recited in claim 6 wherein the first computer is a server and the second computer is a client computer.

12. A computer readable storage memory having instructions for transmitting a content file comprising specific portions arranged in an original sequential order, said instructions when executed by one or more processors perform operations comprising:
   receiving requests from a client computer, the requests having a requested sequence indicating which of the specific portions of the content file are to be transmitted in the original sequential order and which of the specific portions of the content file are to be transmitted out of the original sequential order; transmitting the requests to a server;
   periodically receiving and storing in an assembly file the specific portions of the content file in the original sequential order;
   determining a largest received contiguous sequence of the specific portions of the assembly file in the original sequential order;
   continuously scanning for viruses the largest received contiguous sequence of the specific portions of the assembly file in the original sequential order, said assembly file being scanned while other requested specific portions are being received;
   feeding portions of the scanned file to the client computer.

13. The computer readable storage memory as recited in claim 12 wherein received specific portions are organized in the memory in an original sequential order, and wherein scanning the assembly file comprises scanning a largest consecutive sequence of the stored specific portions in the original sequential order.

14. The computer readable storage memory as recited in 12 wherein the received portions are fed to the client computer in the requested sequence via a network.

15. The computer readable storage memory as recited in 12 wherein feeding the received portions to the client computer is terminated if a virus is detected when continuously scanning the assembly file.

16. The computer readable storage memory as recited in claim 12, the operations further comprising providing an indication to the client computer if a virus is detected when continuously scanning the assembly file.

17. The computer readable storage memory as recited in 12 wherein the scanned assembly file is disassembled into disassembled portions having the requested sequence, and the disassembled portions are fed to the client computer while other specific portions are being received.

18. The computer readable storage memory as recited in 12, the operations further comprising storing an indication of the content file when a virus is detected, and denying a request for specific portions of the content file on future requests for the specific portions of the content file.

* * * * *